United States Patent
Suciu et al.

(10) Patent No.: US 7,500,365 B2
(45) Date of Patent: Mar. 10, 2009

(54) ACCESSORY GEARBOX

(75) Inventors: Gabriel Suciu, Glastonbury, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 730 days.

(21) Appl. No.: 11/122,336

(22) Filed: May 5, 2005

(65) Prior Publication Data

US 2006/0248900 A1 Nov. 9, 2006

(51) Int. Cl.
*F02C 6/00* (2006.01)
(52) U.S. Cl. .................................... 60/802; 74/DIG. 5
(58) Field of Classification Search ................... 60/802, 60/39.83; 74/DIG. 5
See application file for complete search history.

(56) References Cited

U.S. PATENT DOCUMENTS

| | | | | |
|---|---|---|---|---|
| 2,803,943 | A * | 8/1957 | Rainbow | 60/262 |
| 2,978,869 | A * | 4/1961 | Hiscock et al. | 60/802 |
| 3,455,182 | A * | 7/1969 | Kelley | 74/661 |
| 4,437,627 | A * | 3/1984 | Moorehead | 244/54 |
| 4,525,995 | A * | 7/1985 | Clark | 60/39.08 |
| 5,410,870 | A | 5/1995 | Brault et al. | 60/39.33 |
| 5,687,561 | A | 11/1997 | Newton | 60/226.1 |
| 6,357,220 | B1 | 3/2002 | Snyder et al. | 60/39.31 |
| 6,364,249 | B1 | 4/2002 | Morgan et al. | 244/17.11 |
| 6,851,267 | B2 | 2/2005 | Bruno et al. | 60/787 |
| 2005/0150204 | A1 * | 7/2005 | Stretton et al. | 60/39.83 |

* cited by examiner

*Primary Examiner*—William H Rodríguez
(74) *Attorney, Agent, or Firm*—Colin L. Cini

(57) ABSTRACT

Provided is an accessory gearbox for a gas turbine engine that contributes minimally to engine weight and complexity. An accessory gearbox comprises a stationary frame that is circumferentially disposed about a central longitudinal axis of the engine. The frame includes a forward-directed axial face and a rearward-directed axial face for fastening the frame to the engine. A central bore accepts a rotational driving means and an outermost rim circumscribes the outer diameter of the frame. A compartment is located between the bore and the rim. At least one primary accessory is mounted to a face and proximate the compartment, remotely engaging the driving means and able to be driven concurrently therewith.

34 Claims, 7 Drawing Sheets

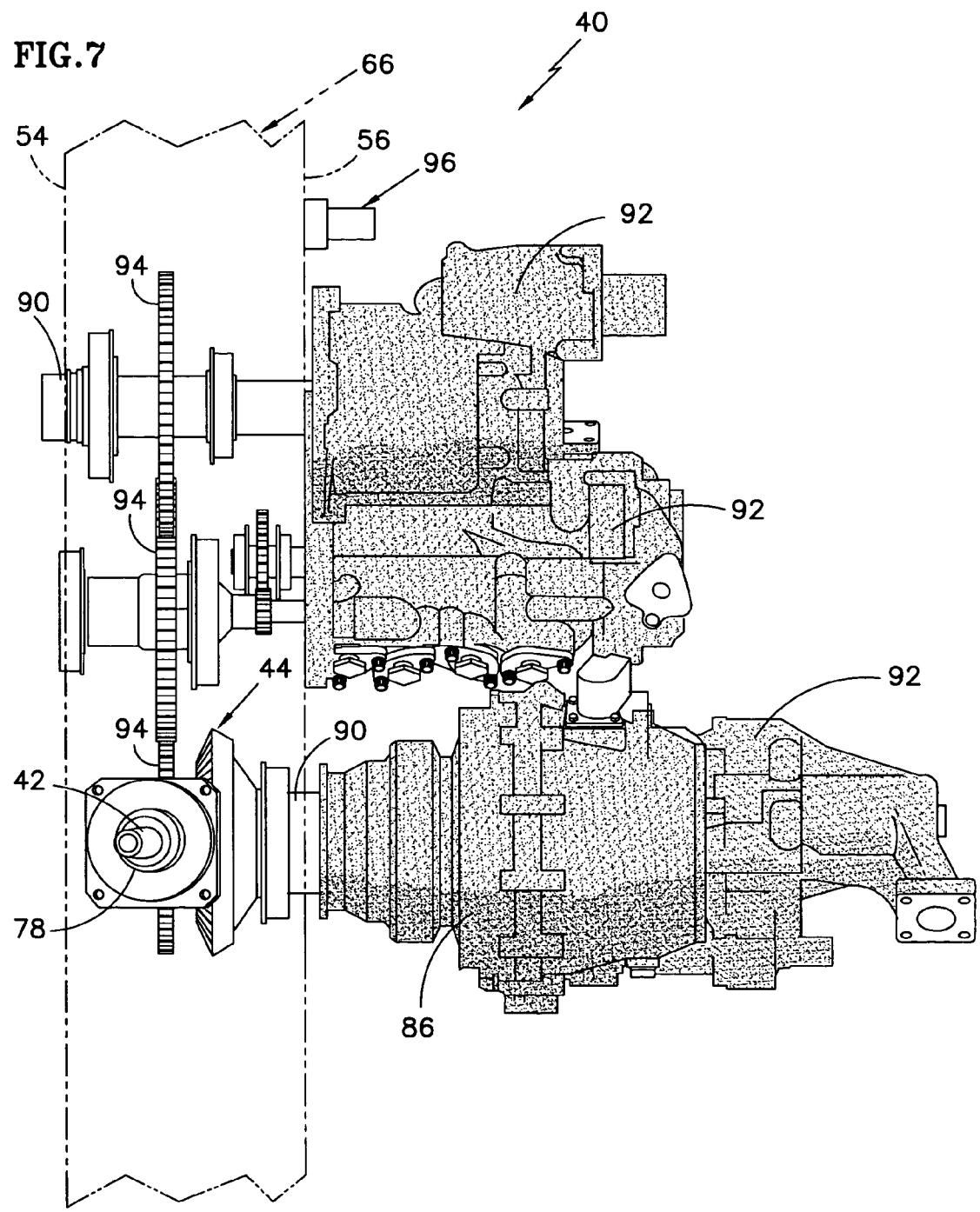

ACCESSORY GEARBOX

BACKGROUND OF THE INVENTION (1) Field of the Invention

The invention relates to an accessory gearbox and more specifically to an accessory gearbox integrated with a stationary frame of a gas turbine engine.

(2) Description of the Related Art

In an axial-flow gas turbine engine, incoming air is directed rearward by a large diameter fan, where the air is typically split into two discrete streams: a core air stream and a bypass air stream. The core air stream enters the engine and is pressurized in series by one or more rotating compressors and is then mixed with fuel in a central combustor. The fuel and air mixture is burned in and expelled from the combustor as hot combustion gases. The hot combustion gases are directed rearward to one or more turbines disposed downstream of the combustor. The turbines extract power from the combustion gases and use the power to rotate the compressors via a common rotor shaft or rotor spool. Conversely, the bypass air stream is directed outside the engine through one or more bypass ducts. The exhausting combustion gases in combination with the bypass air stream generate a propulsive thrust for powering a vehicle such as an aircraft.

Besides producing thrust, a gas turbine engine also supplies power for various systems and accessories essential to the engine and aircraft operation as well as passenger comfort. These systems and accessories are typically powered pneumatically by bleeding core air from the compressors or powered mechanically by engaging the driving means. Since the driving means are located proximate a central longitudinal axis of the engine, a transfer shaft is necessary to transmit the power to an accessory gearbox mounted in an external location. The accessory gearbox allows each accessory to run at an optimum speed and in an accessible location for ease of maintenance, reduced weight and minimum complexity. Accessory gearboxes are conventionally mounted beneath the engine, proximate the combustor, or beneath a cylindrical case surrounding the fan.

Accessory gearboxes mounted beneath the engine require an angle gearbox and two separate transfer shafts to transmit power from the driving means. The first transfer shaft, sometimes referred to as a tower shaft, transmits the power from the driving means, radially downward to the angle gearbox. The second transfer shaft, sometimes referred to as a lay shaft, transmits the power axially rearward from the angle gearbox to the accessory gearbox. The requirement for an angle gearbox housing, lay shaft and accessory gearbox housing adds substantial weight and complexity to the engine. Accessory gearboxes mounted beneath the engine also contribute to engine flexure, which is known to negatively affect compressor and turbine clearances and thus reduces engine fuel efficiency. Also, the area beneath the engine houses many pipes, wires and brackets, which must be tightly packaged around the accessory gearbox. The inaccessibility of the gearbox causes difficulties for maintenance personnel during diagnostic and repair procedures.

Accessory gearboxes mounted beneath the fan case require an extended tower shaft because the fan is very large in diameter. A mid-span bearing and an angle gearbox are used to transmit power from the driving means. The tower shaft transmits the power from the driving means, substantially radially downward and through the fan case to the angle gearbox. The power is transmitted axially forward from the angle gearbox to the accessory gearbox. The requirement for an angle gearbox housing and extended tower shaft with a mid-span bearing adds substantial weight and complexity to the engine. Also, accessory gearboxes mounted beneath the fan case increase the frontal area of the engine, increasing the aircraft drag and thus increasing the engine fuel burn.

What is therefore needed is an accessory gearbox that contributes minimally to engine weight and complexity, while not negatively impacting engine fuel efficiency.

BRIEF SUMMARY OF THE INVENTION

Provided is an accessory gearbox for a gas turbine engine that contributes minimally to engine weight and complexity while improving engine fuel burn. An accessory gearbox, in accordance with the current invention, comprises a stationary frame that is circumferentially disposed about a central longitudinal axis of the engine. The frame includes a forward-directed axial face and a rearward-directed axial face for fastening the frame to the engine. A central bore accepts a rotational driving means and an outermost rim circumscribes the outer diameter of the frame. A compartment is located between the bore and the rim. At least one primary accessory is mounted to a face and proximate the compartment, remotely engaging the driving means and able to be driven concurrently therewith.

Since the inventive accessory gearbox is integrated into an engine frame, there is no need for an extended tower shaft with mid-span bearing, angle gearbox housing, lay shaft or accessory gearbox housing. The elimination of these components from beneath the engine or fan case contributes minimally to engine weight and provides additional area for housing pipes, wires and brackets in order to simplify engine maintenance. A reduction in both engine flexure and frontal area also improves engine fuel burn.

Other features and advantages will be apparent from the following more detailed descriptions, taken in conjunction with the accompanying drawings, which illustrate by way of examples accessory gearboxes in accordance with several embodiments of the invention.

BRIEF DESCRIPTION OF THE SEVERAL VIEWS OF THE DRAWINGS

FIG. 7 is a partial top schematic sectional view showing an accessory gearbox configured for integral mounting in accordance with yet another embodiment of the current invention.

DETAILED DESCRIPTION OF THE INVENTION

Figure 1:
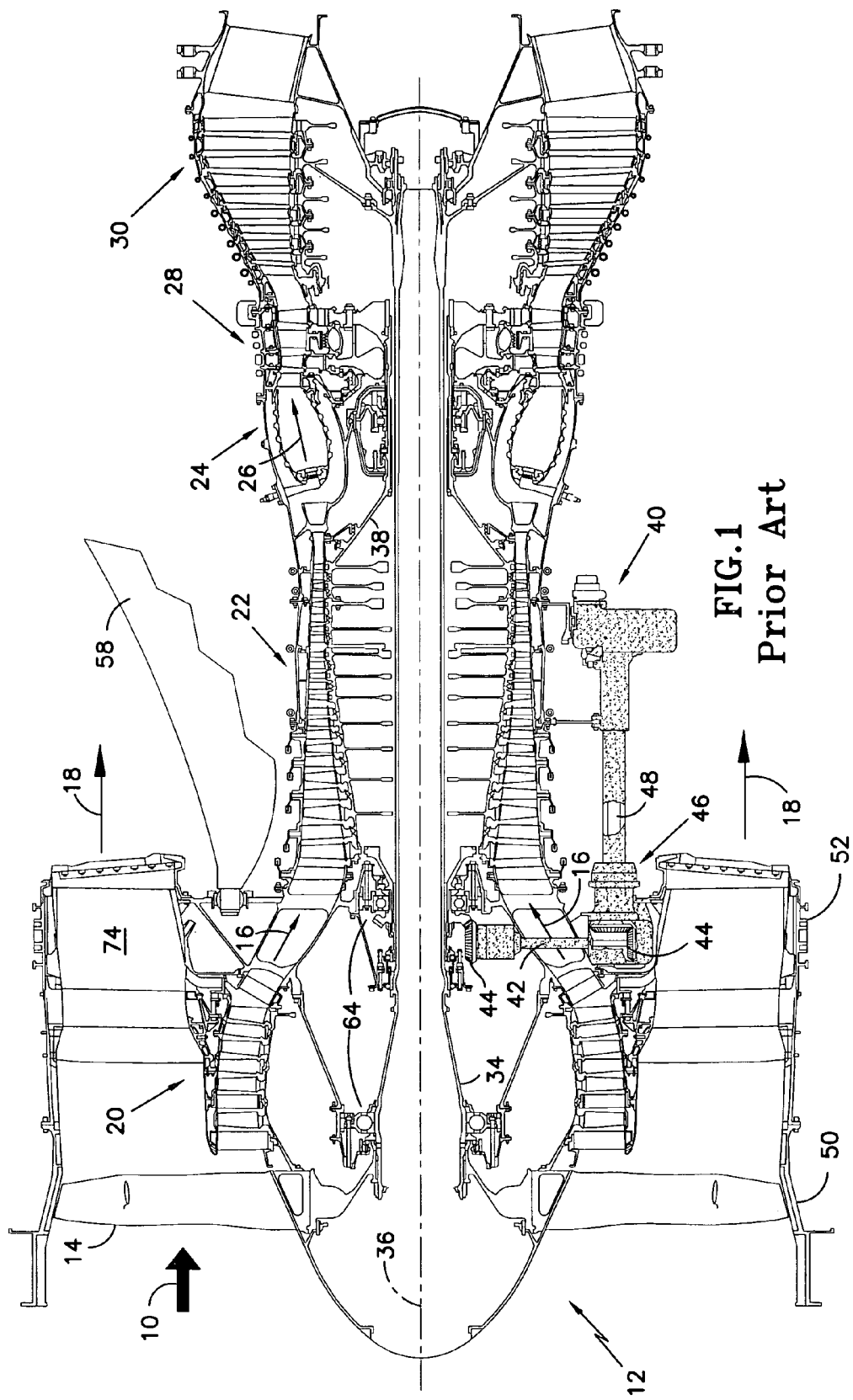
FIG. 1 is a simplified cross sectional view of a gas turbine engine showing a prior art accessory gearbox configured for external mounting under an engine.
Figure 2:
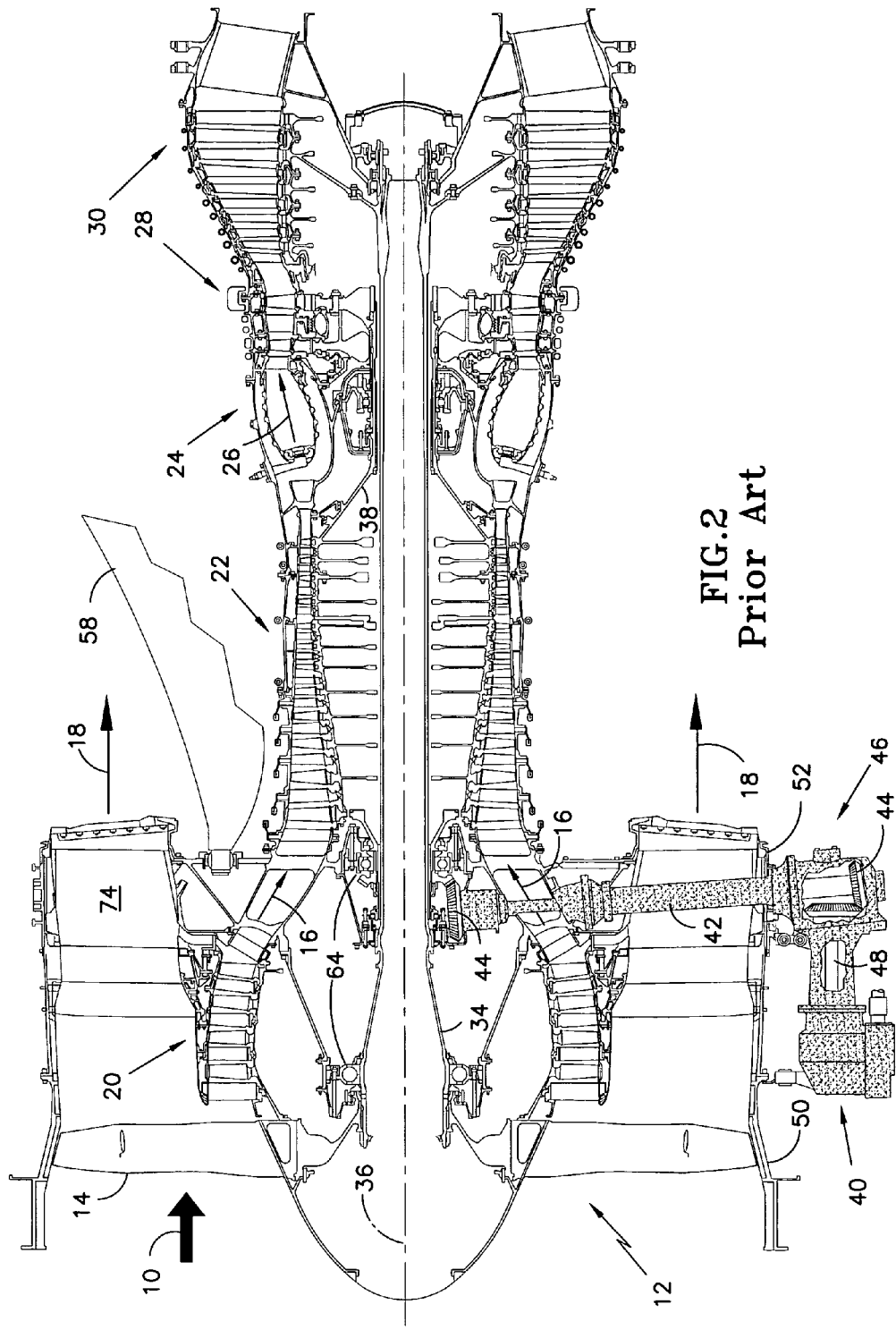
FIG. 2 is a simplified cross sectional view of a gas turbine engine showing a prior art accessory gearbox configured for external mounting on a fan case.
Figure 3:
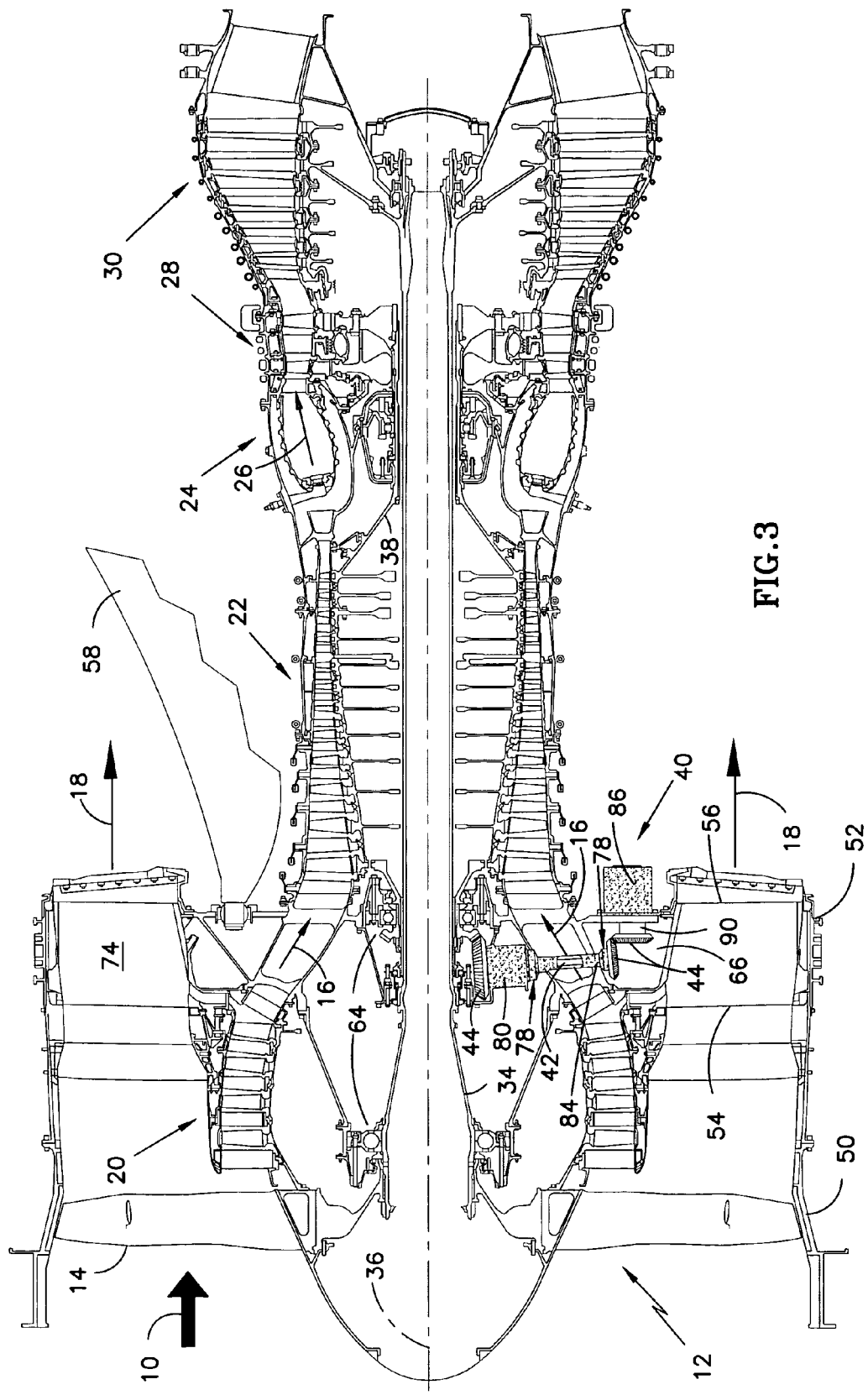
FIG. 3 is a simplified cross sectional view of a gas turbine engine showing an accessory gearbox configured for integral mounting in accordance with an embodiment of the current invention.

Referring first to FIGS. 1, 2 and 3, air 10 enters a gas turbine engine 12 via a forward mounted fan 14, where the air 10 is directed into two discrete streams: a core air stream 16 and a bypass air stream 18. The core air 16 is pressurized in series by a low-pressure compressor 20 and a high-pressure compressor 22, before being mixed with fuel and burned in a centrally mounted combustor 24. The core air 16 exits the combustor 24 as combustion gases 26, which expand in series through a high-pressure turbine 28 and then a low-pressure turbine 30 before being exhausted from the engine 12. The bypass air 18 is directed-outside the engine 12 through one or more bypass ducts 32 (not shown). The exhausting combustion gases 26 in combination with the bypass air 18 generate a forward propulsive thrust. The low-pressure turbine 28 drives the low-pressure compressor 20 via a low rotor shaft 34 revolving about a central, longitudinal axis 36 of the engine 12. Similarly, the high-pressure turbine 30 drives the high-pressure compressor 22 via a high rotor spool 38. Although two compressors 20, 22 and two turbines 28, 30 are shown in each of the engines 12 depicted in the illustrations, more or less may be used.

In each of the prior art engines 12 illustrated in FIGS. 1 and 2, the high rotor spool 38 remotely drives an externally mounted accessory gearbox 40. With specific reference to FIG. 1, a tower shaft 42 engages the high rotor spool 38 proximate the central axis 36 through a bevel gear set 44 and transfers the power radially outward through another bevel gear set 44 within an angle gearbox 46. The power is then transferred approximately rearward via a lay shaft 48 to an accessory gearbox 40 mounted beneath the engine 12. Now referring specifically to FIG. 2, the high rotor spool 38 drives a tower shaft 42 proximate the axis 36 through a bevel gear set 44, which then transfers the power radially outward through another bevel gear set 44 within an angle gearbox 46. The power is finally transferred forward from the angle gearbox 46 to an accessory gearbox 40 mounted to a case 50 circumscribing the fan 14. Deficiencies with each of the prior art accessory gearbox mounting configurations have previously been discussed in the aforementioned sections.

Referring now to FIG. 3, those skilled in the art will appreciate an accessory gearbox 40 integrated into an engine frame 52 for a minimal contribution to engine weight and reduced complexity. Although an intermediate frame 52 is described and illustrated in each of the inventive embodiments below, it is to be understood that any compartmentalized frame 52 may be used.

Figure 4:
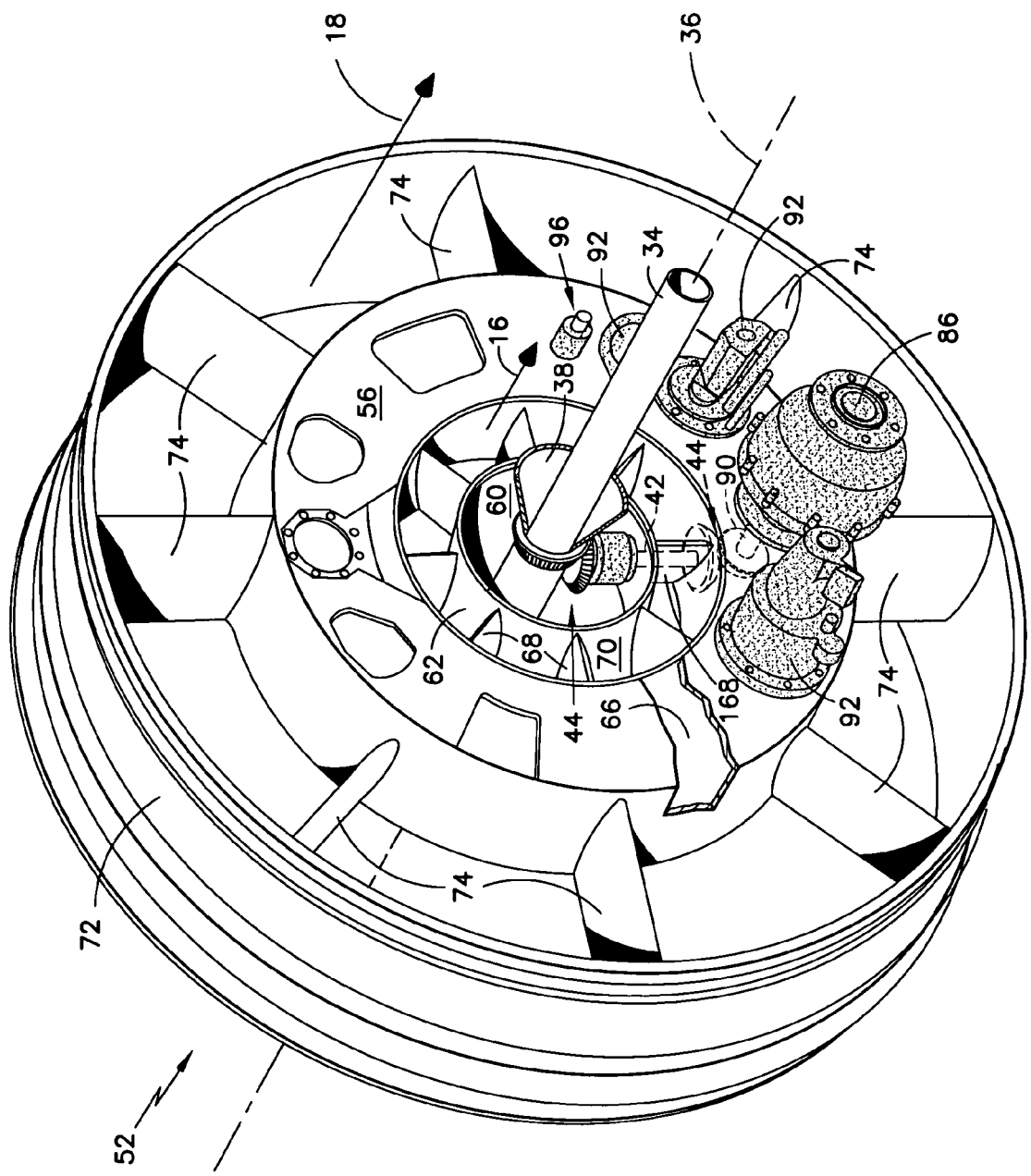
FIG. 4 is an isometric rear view of an intermediate frame showing an accessory gearbox configured for integral mounting in accordance with an embodiment of the current invention.

The intermediate frame 52 is a stationary, nearly cylindrical structure disposed between the low-pressure compressor 20 and the high-pressure compressor 22. A forward axial face 54 is fastened to the low-pressure compressor 20 and a rearward axial face 56 is fastened to both the high-pressure compressor 22 and to a pylon 58 used for attaching the engine 12 to the aircraft. As best illustrated in FIG. 4, the frame 52 further includes a central bore 60 for allowing the low rotor shaft 34 and the high rotor spool 38 to pass there through. An inner hub 62 circumscribes the bore 60, and provides support for the low rotor shaft 34 and the high rotor spool 38 by way of roller bearings 64 (see FIG. 3). A compartment 66 is spaced radially apart from the inner hub 62 by a number of circumferentially spaced inner struts 68, forming an inner diameter annular duct 70 there between. The inner duct 70 directs the core air 16 from the low-pressure compressor 20 to the high-pressure compressor 22. An outermost rim 72 is spaced radially apart from the compartment 66 by a number of circumferentially spaced outer struts 74, forming an outer diameter annular duct 76 therebetween. The outer duct 76 directs the bypass air 18 from the fan 14 to one or more bypass ducts 32 (not shown).

A tower shaft 42 extends substantially radially outward from the bore 60 through the inner hub 62 and an inner strut 68 to the compartment 66. The circumferentially lowermost inner strut 168 is used to facilitate the return of lubricating fluid by gravity from the roller bearings 64 to the compartment 66. The tower shaft 42 is supported by bearings 78, and a first end 80 is driven by the high rotor spool 38 through a first bevel gear set 44. The tower shaft 42 may be driven at the same speed or at a different speed as the high rotor spool 38. A second end 84 directly drives at least one primary accessory 86 mounted to an axial face 54, 56 and proximate the compartment 66. Each primary accessory 86 is driven at an optimum speed by an appropriately sized second bevel gear set 44 and accessory shaft 90. Although the high rotor spool 38 drives the tower shaft 42 in each of the illustrated examples, the low rotor shaft 34 may also be used as a tower shaft 42 driving means.

Figure 5:
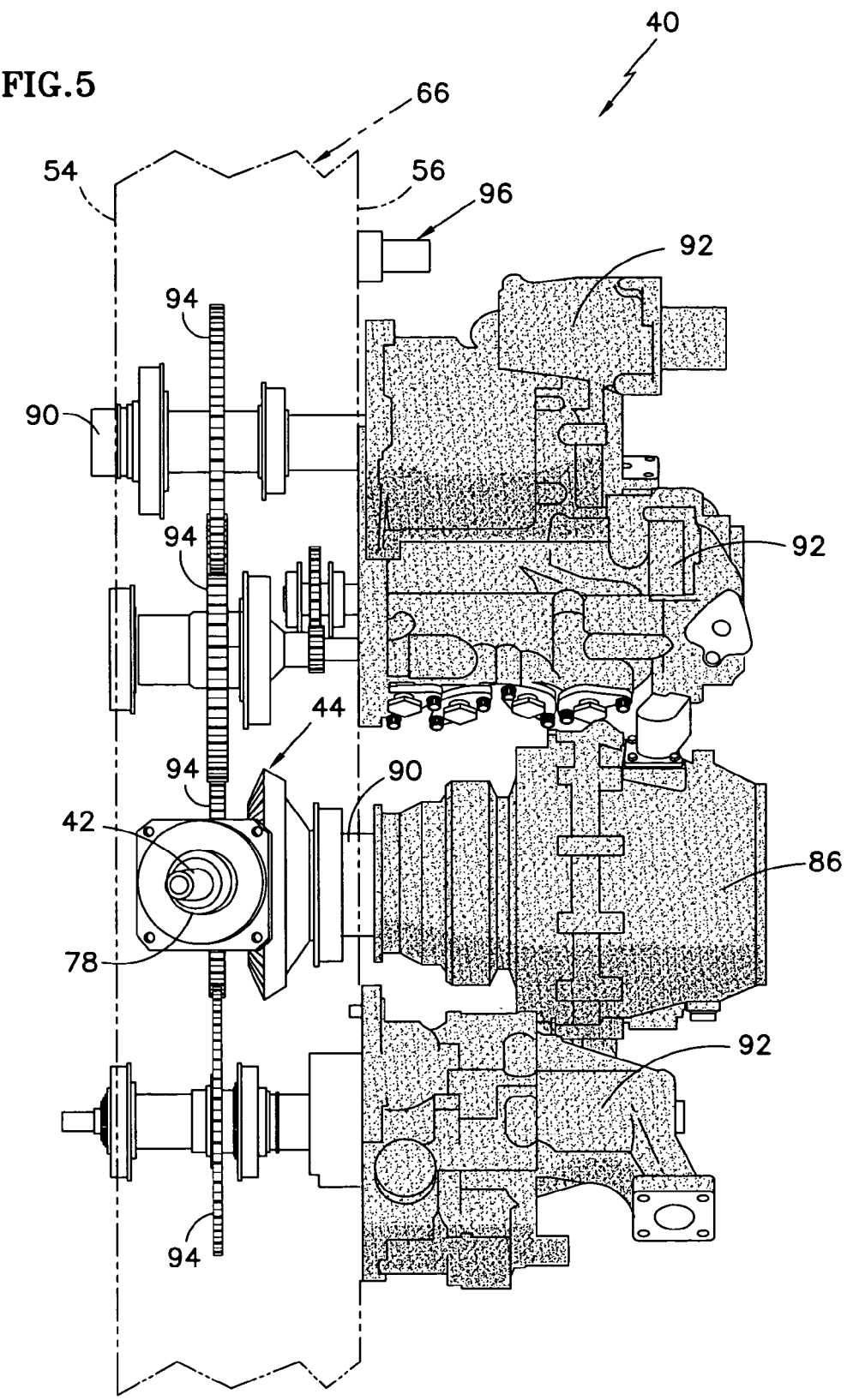
FIG. 5 is a partial top schematic sectional view showing an accessory gearbox configured for integral mounting in accordance with an embodiment of the current invention.
Figure 6:
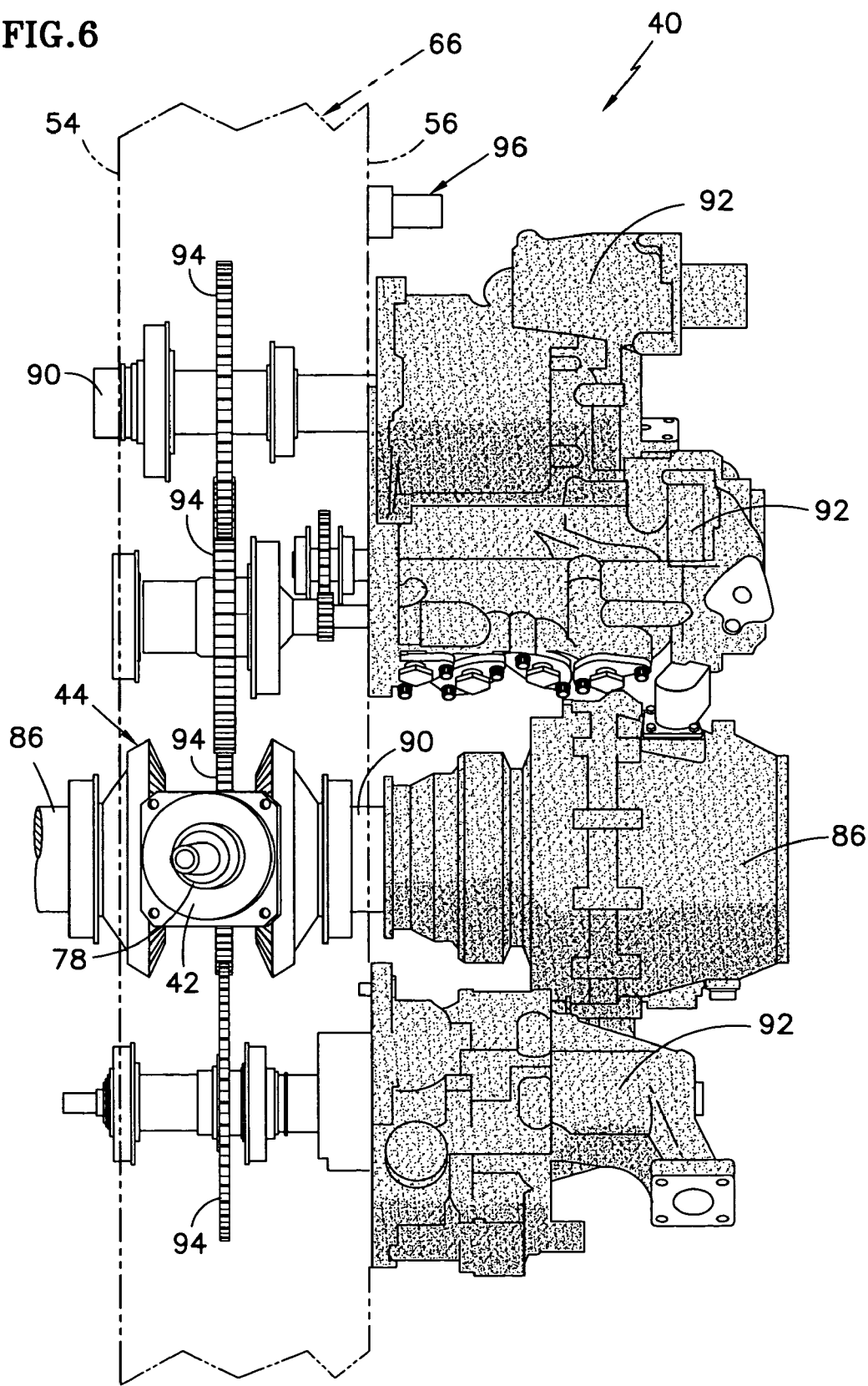
FIG. 6 is a partial top schematic sectional view showing an accessory gearbox configured for integral mounting in accordance with another embodiment of the current invention.

As further illustrated in FIGS. 5 and 6, at least one secondary accessory 92 may also be mounted to an axial face 54, 56 and proximate the compartment 66. Each secondary accessory 92 may be indirectly driven by the tower shaft 42 through a straight gear set 94 engaged with an adjacent accessory 86, 92. By altering the straight gear 94 ratios between accessories 86, 92, the accessories 86, 92 may be driven at their optimum speed. The accessories 86, 92 are distributed circumferentially about the axial faces 54, 56 based upon available area and system requirements. An accessory 86, 92 may include at least one of a starter, an integrated drive generator (IDG), a fuel pump, a hydraulic pump, a lubrication/scavenge pump, a de-oiler, and a permanent magnet alternator (PMA). In the illustrated embodiments, the starter functions as a primary accessory 86 and is directly driven with the tower shaft 42 to enable engine 12 starting.

As the example of FIG. 7 illustrates, a secondary accessory 92 may be mounted in series with a primary accessory 86 as well. The secondary accessory 92 may be driven at the same speed as the primary accessory 86 by sharing a common accessory shaft 90, or may be driven at a different speed be means of a gear set (not shown).

At least one tertiary accessory 96 may be mounted to a face 54, 56 and proximate the compartment 66 as well. The tertiary accessories 96 are typically used for maintenance or to monitor the health of the accessory gearbox 40. The tertiary accessories 96 are not driven and may include an oil filter, a metal chip detector, and an oil pressure-regulating valve.

While the present invention has been described in the context of specific embodiments, applications and vehicles thereof, other alternatives, modifications and variations will become apparent to those skilled in the art having read the foregoing description. Accordingly, it is intended that the present invention embrace those alternatives, modifications and variations as fall within the broad scope of the appended claims.

What is claimed is:

1. An accessory gearbox for use in a gas turbine engine comprising:

a stationary frame, said frame circumferentially disposed about a central longitudinal axis of the engine and including a forward-directed axial face, a rearward-directed axial face, a central bore, an outermost rim, an inner hub extending radially outward from the bore, an inner diameter annular duct extending radially outward from the hub, a compartment extending radially outward from the inner diameter annular duct, an outer diameter annular duct extending radially outward from the compartment to the outermost rim;

a rotational driving means disposed about the axis, said driving means extending into the central bore;

a rotational tower shaft, said tower shaft including a first end for engaging the driving means and a second end disposed in the compartment; and at least one primary accessory mounted to a face and proximate the compartment, said at least one primary accessory extending into the compartment and engaging the tower shaft second end and able to be driven concurrently therewith.

2. The accessory gearbox of claim 1 wherein said at least one primary accessory is selected from the group consisting of a starter, an integrated drive generator, a fuel pump, a hydraulic pump, a lubrication scavenge pump, a de-oiler, and a permanent magnet alternator.

3. The accessory gearbox of claim 2 wherein at least one of the primary accessories is mounted to the rearward-directed face.

4. The accessory gearbox of claim 2 wherein said at least one primary accessory consists of the starter.

5. The accessory gearbox of claim 2 wherein the at least one primary accessory further engages at least one secondary accessory selected from the group consisting of a starter, an integrated drive generator, a fuel pump, a hydraulic pump, a lubrication scavenge pump, a de-oiler, and a permanent magnet alternator.

6. The accessory gearbox of claim 5 wherein at least one of the secondary accessories is mounted to a face and proximate the compartment.

7. The accessory gearbox of claim 6 wherein at least one of the secondary accessories is mounted to the rearward-directed face.

8. The accessory gearbox of claim 5 wherein at least one of the secondary accessories is mounted to the at least one primary accessory and able to be driven concurrently therewith.

9. The accessory gearbox of claim 5 further comprising at least one tertiary accessory mounted to a face and proximate the compartment selected from the group consisting of an oil filter, a metal chip detector, and an oil pressure-regulating valve.

10. The accessory gearbox of claim 9 wherein at least one of the tertiary accessories is mounted to the rearward-directed face.

11. The accessory gearbox of claim 1 wherein said driving means is a rotor spool.

12. The accessory gearbox of claim 1 wherein said driving means is a rotor shaft.

13. The accessory gearbox of claim 1 wherein said driving means operates at a first speed and said tower shaft operates at a second speed that is different than the first speed.

14. The accessory gearbox of claim 1 wherein said frame is a mid compressor frame.

15. In a gas turbine engine with a rotational driving means, an accessory gearbox comprising:

a stationary frame, said frame including a forward-directed axial face, a rearward-directed axial face, a radially innermost bore, a radially outermost rim and a compartment located between the bore and the rim; at least one primary accessory mounted to a face and proximate the compartment, said primary accessory remotely engaging the driving means and able to be driven concurrently therewith and said at least one primary accessory is selected from the group consisting of a starter, an integrated drive generator, a fuel pump, a hydraulic pump, a lubrication scavenge pump, a de-oiler, and a permanent magnet alternator; and wherein the at least one primary accessory further engages at least one secondary accessory selected from the group consisting of a starter, an integrated drive generator, a fuel pump, a hydraulic pump, a lubrication scavenge pump, a de-oiler, and a permanent magnet alternator.

16. The frame of claim 15 wherein at least one of the secondary accessories is mounted to a face and proximate the compartment.

17. The frame of claim 16 wherein at least one of the secondary accessories is mounted to the rearward-directed face.

18. The frame of claim 15 wherein at least one of the secondary accessories is mounted to the at least one primary accessory and able to be driven concurrently there with.

19. The frame of claim 15 further comprising at least one tertiary accessory mounted to a face and proximate the compartment selected from the group consisting of an oil filter, a metal chip detector, and an oil pressure-regulating valve.

20. The frame of claim 19 wherein at least one of the tertiary accessories is mounted to the rearward-directed face.

21. An accessory gearbox for use in a gas turbine engine comprising:

a stationary frame, said frame circumferentially disposed about a central longitudinal axis of the engine and including a forward-directed axial face, a rearward-directed axial face, an innermost diameter bore, an outermost diameter rim and a compartment located between the bore and rim;

a rotational driving means:

a rotational tower shaft, said tower shaft including a first end for engaging the driving means and a second end disposed in the compartment; and at least one primary accessory mounted to a face and proximate the compartment, said at least one primary accessory extending into the compartment and engaging the tower shaft second end and able to be driven concurrently therewith.

22. The accessory gearbox of claim 21 wherein said at least one primary accessory is selected from the group consisting of a starter, an integrated drive generator, a fuel pump, a hydraulic pump, a lubrication scavenge pump, a de-oiler, and a permanent magnet alternator.

23. The accessory gearbox of claim 22 wherein at least one of the primary accessories is mounted to the rearward-directed face.

24. The accessory gearbox of claim 22 wherein said at least one primary accessory consists of the starter.

25. The accessory gearbox of claim 22 wherein the at least one primary accessory further engages at least one secondary accessory selected from the group consisting of a starter, an integrated drive generator, a fuel pump, a hydraulic pump, a lubrication scavenge pump, a de-oiler, and a permanent magnet alternator.

26. The accessory gearbox of claim 25 wherein at least one of the secondary accessories is mounted to a face and proximate the compartment.

27. The accessory gearbox of claim 26 wherein at least one of the secondary accessories is mounted to the rearward-directed face.

28. The accessory gearbox of claim 25 wherein at least one of the secondary accessories is mounted to the at least one primary accessory and able to be driven concurrently therewith.

29. The accessory gearbox of claim 25 further comprising at least one tertiary accessory mounted to a face and proximate the compartment selected from the group consisting of an oil filter, a metal chip detector, and an oil pressure-regulating valve.

30. The accessory gearbox of claim 29 wherein at least one of the tertiary accessories is mounted to the rearward-directed face.

31. The accessory gearbox of claim 21 wherein said driving means is a rotor spool.

32. The accessory gearbox of claim 21 wherein said driving means is a rotor shaft.

33. The accessory gearbox of claim 21 wherein said driving means operates at a first speed and said tower shaft operates at a second speed that is different than the first speed.

34. The frame of claim 21 wherein said frame is a mid compressor frame.

* * * * *